A. CAMPBELL.
DUMP CAR DOOR OPERATING MECHANISM.
APPLICATION FILED JUNE 3, 1918.
1,284,056.
Patented Nov. 5, 1918.
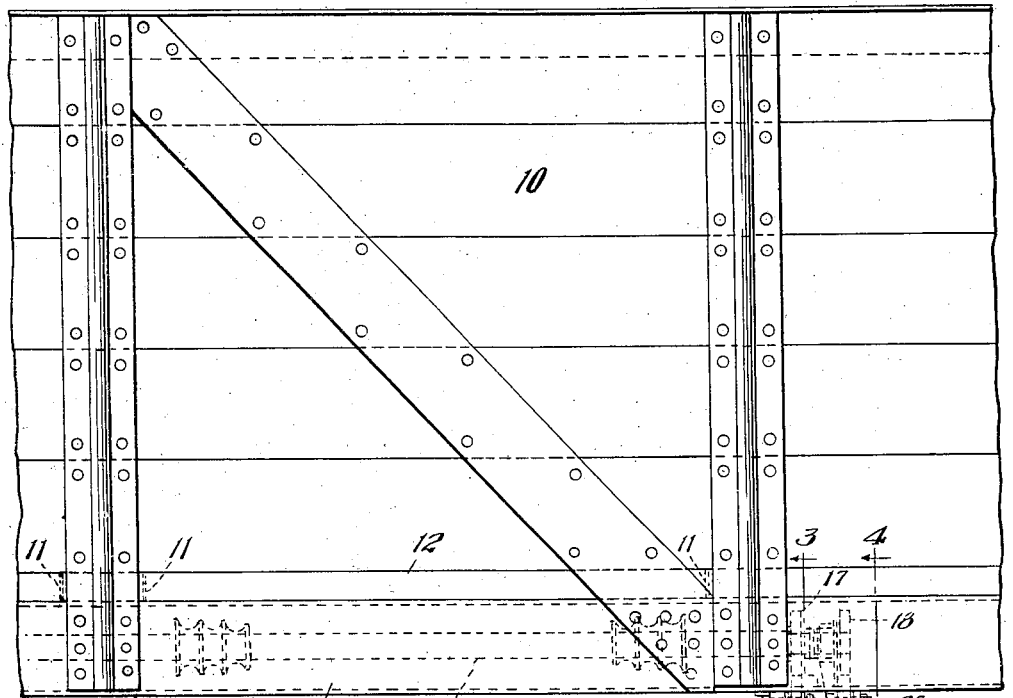
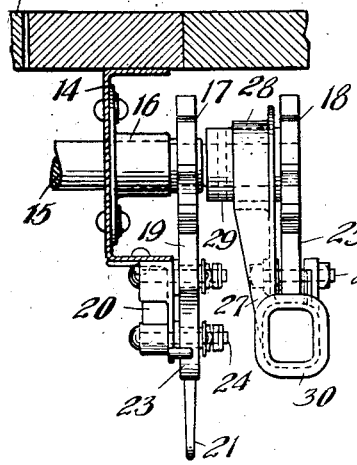
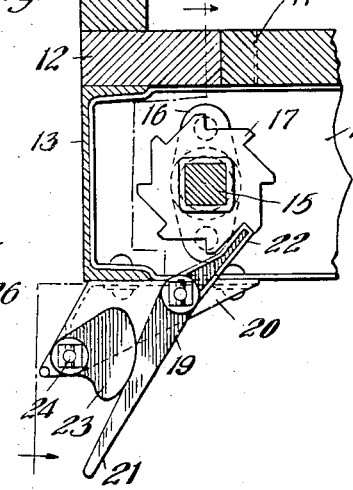
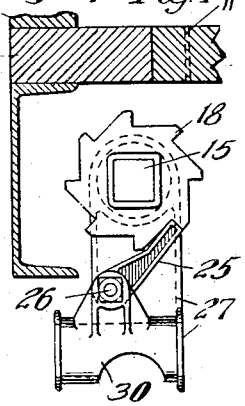
Inventor
Argyle Campbell
George I. Haight
Atty.

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS.

DUMP-CAR-DOOR-OPERATING MECHANISM.

1,284,056.

Specification of Letters Patent. Patented Nov. 5, 1918.

Application filed June 3, 1918. Serial No. 237,877.

*To all whom it may concern:*

Be it known that I, ARGYLE CAMPBELL, a citizen of the United States, residing at Chicago, in the county of Cook and State of Illinois, have invented a certain new and useful Improvement in Dump-Car-Door-Operating Mechanism, of which the following is a full, clear, concise, and exact description, reference being had to the accompanying drawings, forming a part of this specification.

This invention relates to improvements in dump car door operating mechanism.

In certain types of dump cars, the door operating shafts are located near the sides of the car and extend longitudinally thereof behind side sills, which depend below the floor of the car. This obscures the door operating shaft from the operator when the operator stands in any ordinary position at one side of the car. In order to successfully manipulate shafts located as above mentioned, that is, render the parts actually manipulated by the operator visible in order to insure safety, it has been customary to extend the shafts through the body bolsters and end sills and apply the ratchet mechanism or other devices at the end of the shaft at the end of the car. This practice involves considerable unnecessary expense in that longer shafts are required than actually necessary since there are ordinarily no doors located over the trucks or near the end of the car, the doors being located between the trucks only. In addition, it is, of course, evident that extra expense is involved in perforating the bolsters and end sills and in applying the additional bearings required at these points for the shaft. Furthermore, the longer the shaft, the greater the torsional effect thereon so that heavier shafts are required where they are extended to the end of the car than would be required if the shafts were made shorter and terminated at the end of the pivoted door section of the car.

The object of my invention is to provide a door operating arrangement for dump cars having the operating shafts located as herein first mentioned, the mechanism being so designed that all of the parts which are manipulated by the operator are visible and readily accessible to the operator while the operator assumes his usual position before the car and without the necessity of crouching beneath the car to get at the parts.

Another and more specific object of the invention is to provide a door operating mechanism having the characteristics above indicated and which will afford absolute safety to the operator at all times, particularly when releasing the shaft with the load on the doors.

In the drawing forming a part of this specification, Figure 1 is a side elevational view of a portion of a dump car showing my improvements in connection therewith, the portion of the car shown representing that portion of the car which is at the end of the dumping section terminating adjacent one of the trucks, the inner car wheel of the truck being partly indicated by the curved line *a*. Fig. 2 is a longitudinally extending section of the car structure shown in Fig. 1, but on a somewhat larger scale, the section being taken inside of the side sill and corresponding substantially to the line 2—2 of Fig. 3. And Figs. 3 and 4 are detail, vertical, sectional views, taken on the lines 3—3 and 4—4 respectively of Fig. 1.

In said drawing, the side wall of the car is designated as 10 and may be formed in any suitable manner as by means of planks, pressed stakes and diagonal braces. The car is of that type having pivoted drop bottom doors, one of which is indicated at 11 in Figs. 1, 3 and 4. The dumping door section extends between the trucks of the car only, one wheel of one truck being indicated by the reference *a* in Fig. 1. The car is also provided on each side thereof with a floor strip 12 flush with the floor doors and below which is disposed a channel side sill 13 having the flanges of the channel extended inwardly. The car is also provided with the usual diaphragms as indicated at 14, the same being preferably of pressed plate formation.

For operating the doors, the car is provided on each side thereof with a longitudinally extending shaft 15 which is mounted in suitable bearing brackets 16 attached to the various diaphragms. The shaft 15 terminates adjacent the end floor door 11 as shown in Fig. 1 and, as clearly shown in the drawings, the shaft is obscured from the view of the operator and practically inaccessible while the operator is in any normal position beside the car.

The improved operating and locking mechanism for the shaft, which I have provided, consists broadly of a locking ratchet wheel 17, an operating ratchet wheel 18, a locking dog 19 and a pawl arrangement for the ratchet wheel 18 hereinafter specifically described. The locking ratchet wheel 17 is non-rotatably attached to the shaft 15 preferably by making the adjacent portion of the shaft 15 square, as indicated in Fig. 3. The locking dog 19 is pivoted to a bracket 20 which is secured to the under side of the diaphragm 14 and side sill 13. Said locking dog 19 is gravity actuated by forming the handle 21 thereof heavier than the engaging portion 22 so that the engaging portion 22 will automatically drop into locking position with respect to the ratchet wheel 17. To prevent accidental disengagement of the locking dog 19 I provide a cam 23 pivotally attached to the bracket 20 as indicated at 24. Fig. 3 shows the cam 23 in locking position and it will be understood that in order to release the shaft, the cam 23 is kicked out and then the operator grasps the handle portion 21 and disengages the locking dog from the ratchet wheel 17 whereupon the doors will drop downwardly and the shaft will be rotated in a clockwise direction, as viewed in Fig. 3, due to the chain connections between the doors and the shaft, as will be understood.

To wind up the shaft, the ratchet wheel 18 is employed and coöperable with said ratchet wheel 18 is a gravity pawl 25 which is pivoted as indicated at 26 on a hanger 27. The hanger 27 is provided at its upper end with a bearing sleeve 28 freely oscillatably mounted on the hub 29 formed integrally with the ratchet wheel 18. At its lower end, the hanger 27 is provided with an enlarged socket 30 extending normally horizontally and adapted to receive therein the end of a claw bar or other suitable operating tool for producing leverage.

In effecting the winding operation, the operator puts his claw bar or other tool in the socket 30 and then swings the bar downwardly as viewed in Fig. 4. In preparing for this movement, the operator will engage the pawl 25 with the ratchet wheel 18 by hand and the weight of the tool applied to the socket 30 will be sufficient to keep the pawl in engagement until the operator actually forces the tool downwardly and thereby rotates the ratchet wheel 18 and shaft 15, a part of a revolution. When the shaft is thus rotated one step, it is evident that the locking dog 19 will automatically hold the shaft and catch it in whatever position it may have been adjusted to, the teeth of the two ratchet wheels being alined for this purpose. Upon release of pressure on the operating tool, it is evident that the hanger 27 and pawl 25 will automatically swing downwardly under the influence of gravity and the pawl 25 disengaged from the ratchet wheel. The pawl 25 will be disengaged under the influence of gravity and also will be positively kicked out from the ratchet wheel 18 as the hanger swings back to normal position. These operations are repeated until the doors are lifted to fully closed position whereupon the operator removes the tool from the socket 30 and the pawl 25 will positively assume an inoperative position and leave the ratchet wheel 18 free. The winding up movement having been completed, the operator will then throw the cam 23 into position.

From the preceding description, it will be seen that all of the parts which are directly manipulated by the operator are readily visible and accessible so that the operator can act with safety. Furthermore, the pawl 25 is positively disengaged from the ratchet wheel 18 at the end of the winding movement so that danger to the operator due to sudden release of the shaft with the load thereon, will not endanger the operator which might result from suddenly throwing any of the operating parts into motion.

The construction is obviously relatively cheap to manufacture, simple, easily operated, and eliminates all the disadvantages of the present usual construction hereinbefore mentioned.

I claim:

1. In a dump car having a depending sill and a shaft extending parallel to said sill and located behind it above the lower edge of the sill and normally obscured from view, the combination with pawl and ratchet mechanism for rotating said shaft, said pawl and ratchet mechanism including a member depending below said sill so as to be readily visible and accessible for operation, of means for locking said shaft against accidental reverse rotation and including a member also extended below said sill by which the operator may release the locking mechanism.

2. In a dump car having a sill extending below the floor level of the car and an operating shaft extending parallel to the sill and disposed behind the sill, the combination with pawl and ratchet mechanism for rotating said shaft, said pawl and ratchet mechanism including a gravity actuated pawl adapted to automatically assume an inoperative position under the influence of gravity, of means for locking said shaft against accidental reverse rotation and including a member extending below the sill by which the locking mechanism may be released.

3. In a dump car having a longitudinally extending sill and a door operating shaft mounted behind said sill and normally obscured from view, the combination with means for rotating said shaft to close the doors, of means for locking said shaft against reverse rotation, said locking means including a ratchet wheel mounted on the shaft and disposed behind said sill, a locking dog pivotally mounted and adapted automatically under the influence of gravity to always assume an operative position with respect to said ratchet wheel, and means for locking said dog against accidental disengagement, said dog having an operating handle extended below said sill and readily accessible to an operator for manipulation.

4. In a dump car having a sill depending below the floor level thereof and a shaft mounted behind said sill and extending parallel thereto, the combination with two ratchet wheels mounted on said shaft with their teeth in alinement, of an oscillatable hanger depending from said shaft to a point below said sill, a pawl carried by said hanger and coöperable with one of said ratchet wheels to effect the winding movement of the shaft, a locking dog pivotally mounted and coöperable with the other of said ratchet wheels, said dog having a handle extended below said sill and readily accessible to an operator, and means for locking said dog against accidental disengagement.

5. In a dump car having pivoted floor doors and a side sill extending below the car floor, the combination with a longitudinally extending door operating shaft mounted below the car floor and behind said side sill, said shaft terminating intermediate the ends of the car, of a pair of ratchet wheels mounted on the end of said shaft and disposed behind said side sill, a hanger oscillatably mounted on said shaft and having a portion thereof extended below the side sill, said portion being provided with a socket to receive an operating tool, a pawl pivotally mounted on said hanger and arranged to coöperate with one of said ratchet wheels, said hanger being adapted to automatically assume a depending vertical position and said pawl automatically assuming an inoperative position, a bracket mounted below said sill, a locking dog pivotally mounted on said bracket and adapted to coöperate with the other of said ratchet wheels, said dog having an operating handle disposed below the sill, and a locking cam pivotally mounted on said bracket coöperable with said dog.

6. In a dump car having pivoted floor doors, transversely extending underframe members and side sills disposed below the floor level, the combination with a longitudinally extending operating shaft passing through said transversely extending underframe members and disposed behind one of the side sills, said shaft terminating intermediate the ends of the car, of means for rotating said shaft so as to effect closing movement of the doors, said means including a ratchet wheel on said shaft, a hanger associated with said ratchet wheel and having a portion thereof extending down below the side sill and thereby exposed to view, a pawl coöperable with the ratchet wheel, said hanger being adapted to receive an operating tool; and means for locking said shaft against accidental reverse rotation, said means including another ratchet wheel mounted on the shaft, and a pivoted locking dog coöperable with said ratchet wheel, said locking dog having a portion thereof extended down below said side sill and thereby readily accessible for manipulation.

In witness that I claim the foregoing I have hereunto subscribed my name this 27th day of May, 1918.

ARGYLE CAMPBELL.